(12) United States Patent
Cho et al.

(10) Patent No.: US 10,185,792 B2
(45) Date of Patent: Jan. 22, 2019

(54) METHOD FOR PREDICTING SLAGGING PRODUCTION POSITION AND SLAGGING PRODUCTION POSSIBILITY IN FURNACE

(71) Applicant: DOOSAN HEAVY INDUSTRIES & CONSTRUCTION CO., LTD., Changwon, Gyeongsangnam-do (KR)

(72) Inventors: Eunseong Cho, Busan (KR); Dongkil Kim, Busan (KR); Hyukje Kim, Gyeongsangnam-do (KR); Byounghwa Lee, Busan (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 182 days.

(21) Appl. No.: 15/267,297

(22) Filed: Sep. 16, 2016

(65) Prior Publication Data

US 2017/0177758 A1   Jun. 22, 2017

(30) Foreign Application Priority Data

Dec. 22, 2015  (KR) .................. 10-2015-0183900
Dec. 22, 2015  (KR) .................. 10-2015-0183906

(51) Int. Cl.
  *G06F 17/50*    (2006.01)
  *F22B 35/18*    (2006.01)
  (Continued)

(52) U.S. Cl.
  CPC .......... *G06F 17/5009* (2013.01); *F22B 35/18* (2013.01); *F22B 37/108* (2013.01);
  (Continued)

(58) Field of Classification Search
  CPC .. G06F 17/5009; G06F 2217/16; F22B 35/18;
  F22B 37/108; F22B 37/38; F28G 3/166;
  G06Q 50/06
  (Continued)

(56) References Cited

U.S. PATENT DOCUMENTS 9,157,633 B2 * 10/2015 Akiyama ................... F23J 9/00
2013/0047787 A1 * 2/2013 Horiguchi ........... C21B 13/0046
                                                                    75/303

FOREIGN PATENT DOCUMENTS

JP     2004-177018 A    6/2004
JP     2008-231294 A   10/2008
        (Continued)

OTHER PUBLICATIONS

Clark et al. "Intelligent Soot Blowing Installation Experience at Homer City". Electric Power 2005., 20 Pages.*
(Continued)

*Primary Examiner* — Eunhee Kim
(74) *Attorney, Agent, or Firm* — INVENSTONE Patent, LLC

(57) ABSTRACT

The present disclosure relates to a method for predicting a slagging production position and a slagging production possibility in a furnace, the method including: the analyzing step of analyzing physical compositions of two or more kinds of coal; the phase diagram producing step of producing a phase diagram on the basis of the physical components of the two or more kinds of coal analyzed in the analyzing step; the deriving step of simulating the situation generated when the two or more kinds of coal are co-fired on the basis of the produced phase diagram; and the characteristic analyzing step of analyzing the characteristics in the furnace in the co-firing process of the two or more kinds of coal.

14 Claims, 9 Drawing Sheets
(2 of 9 Drawing Sheet(s) Filed in Color)

(51) Int. Cl.
*F22B 37/10* (2006.01)
*F22B 37/38* (2006.01)
*F28G 3/16* (2006.01)
*G06Q 50/06* (2012.01)

(52) U.S. Cl.
CPC .............. *F22B 37/38* (2013.01); *F28G 3/166* (2013.01); *G06Q 50/06* (2013.01); *G06F 2217/16* (2013.01)

(58) Field of Classification Search
USPC ........................................................ 703/2, 12
See application file for complete search history.

(56) References Cited

FOREIGN PATENT DOCUMENTS

| | | | |
|---|---|---|---|
| JP | 2009169859 A | 7/2009 | |
| KR | 1020070112967 A | 11/2007 | |
| KR | 101131149 B1 | 3/2012 | |
| KR | 1020120041738 A | 5/2012 | |
| KR | 1020120107125 A | 9/2012 | |
| KR | 1020130078714 | * 7/2013 | ................ C10J 3/00 |
| KR | 1020130078714 A | 7/2013 | |
| KR | 1020130122515 A | 11/2013 | |
| KR | 1020150018889 A | 2/2015 | |

OTHER PUBLICATIONS

Communication dated Apr. 10, 2017 issued by the Korean Patent Office in counterpart application No. 10-2015-0183900.
Communication dated Dec. 13, 2016, issued by the European Patent Office in corresponding European Application No. 16001388.4.
Pakamon Pintana et al., "Prediction of Slag Occurrences in a Lignite-Fired Utility Boiler", WSEAS Transactions on Environment and Development, 2014, vol. 10, pp. 202-210, EISSN: 2224-3496.
Pakamon Pintana et al., "Predicted formation and deposition of slag from lignite combustion on pulverized coal boilers", Recent Advances in Biomedical & Chemical Engineering and Materials Science, 2014, pp. 155-159, ISBN: 978-1-61804-223-1.
Xuebin Wang et al., "The Ash Deposition Mechanism in Boilers Burning Zhundong Coal with High Contents of Sodium and Calcium: a Study from Ash Evaporating to Condensing", Applied Thermal Engineering, 2015, pp. 150-159 (23 pgs. total).

* cited by examiner

METHOD FOR PREDICTING SLAGGING PRODUCTION POSITION AND SLAGGING PRODUCTION POSSIBILITY IN FURNACE

CROSS REFERENCE TO RELATED APPLICATION

This application claims priority from Korean Patent Application No. 10-2015-0183906 filed on Dec. 22, 2015, and Korean Patent Application No. 10-2015-0183900 filed on Dec. 22, 2015, both filed with the Korean Intellectual Property Office, the disclosures of which are incorporated herein by reference in their entirety.

BACKGROUND

Field

The present disclosure relates to a method for predicting a slagging production position and a slagging production possibility in a furnace, and more particularly, to a method for predicting a slagging production position and a slagging production possibility in a furnace that derives, in the furnace using two or more kinds of coal as fuel, a non-linear melting temperature by coal generated upon co-firing of the two or more kinds of coal, and predicts gas and metals temperatures and heat flux by position in the furnace through computational fluid dynamics (hereinafter, which is referred to as CFD) simulation, thereby predicting the slagging production position and the slagging production possibility in the furnace.

Background of the Related Art

While coal is being burned in a furnace used generally in a thermal power plant, slagging as deposits is formed within the furnace, thereby undesirably causing the efficiency of the furnace to be decreased.

When coal ash is accumulated at a high temperature, in more detail, slagging is generally produced on the outer peripheral wall of a steam conveying tube in the interior of the plant furnace. The production of slagging interrupts heat transfer from fuel gas to the steam conveying tube, thereby reducing the whole efficiency of the thermal power plant.

In some serious cases, the operation of the furnace has to stop due to the existence of slagging, and next, the outer peripheral surface of the steam conveying tube in the interior of the furnace is cleaned or repaired.

If two or more kinds of coal are blended and co-fired, they have different percentages of ten or more elements such as iron, aluminum, natrium, calcium and so on, and accordingly, there is a need to derive the composition of each kind of coal and the melting temperature of the composition and thus to predict a non-linear melting temperature by coal generated in the process of the co-firing of the two or more kinds of coal, thereby recognizing that the production of slagging is in advance prevented when any kinds of coal are co-fired.

In addition, there is a need to derive a non-linear melting temperature by coal generated in the process of the co-firing of the two or more kinds of coal and thus to predict gas and metals temperatures and heat flux by position in the furnace through CFD simulation, thereby predicting a slagging production position and a slagging production possibility in the furnace.

SUMMARY

Accordingly, the present disclosure has been made in view of the above-mentioned problems occurring in the prior art, and it is an object of the present disclosure to provide a method for predicting a slagging production position and a slagging production possibility in a furnace that can derive non-linear melting temperatures upon co-firing of two or more kinds of coal since the two or more kinds of coal have different percentages of ten or more elements such as iron, aluminum, natrium, calcium and so on upon their blending and co-firing, and derive the composition by coal and the melting temperature of the composition, thereby recognizing that the production of slagging is in advance prevented when any kinds of coal are co-fired, and further can derive a non-linear melting temperature by coal generated in the process of the co-firing of the two or more kinds of coal and predict the gas and metals temperatures and heat flux by position in the furnace through CFD simulation, thereby predicting the slagging production position and the slagging production possibility in the furnace.

To accomplish the above-mentioned object, according to the present disclosure, there is provided a method for predicting a slagging production position and a slagging production possibility in a furnace, the method including: the analyzing step of analyzing physical components of two or more kinds of coal; the phase diagram producing step of producing a phase diagram on the basis of the physical components of the two or more kinds of coal analyzed in the analyzing step; the deriving step of simulating the situation generated when the two or more kinds of coal are co-fired on the basis of the produced phase diagram; and the characteristic analyzing step of analyzing the characteristics in the furnace in the co-firing process of the two or more kinds of coal.

According to the present disclosure, desirably, the method further includes the calculating step of conducting detailed numerical calculation of the two or more kinds of coal with the result of the deriving step.

According to the present disclosure, desirably, the analyzing step includes the ash mass analyzing step through the proximate analysis of coal, the composition analyzing step of analyzing the kinds of ash compositions and the main composition analyzing step of analyzing the contents of the ash compositions in detail.

According to the present disclosure, desirably, the phase diagram producing step includes: the algorithm producing step of producing an algorithm of slagging prediction; the programming step of applying the algorithm of slagging prediction to a computer program; and the output step of inputting the algorithm of slagging prediction in the programming step and outputting the inputted results.

According to the present disclosure, desirably, the deriving step includes the melting temperature deriving step of deriving the melting temperatures of the ash compositions of the coal, the phase deriving step of deriving primary phase, and the possibility deriving step of deriving the slagging production possibility.

According to the present disclosure, desirably, the characteristic analyzing step analyzes the characteristics in the furnace through computational fluid dynamics.

According to the present disclosure, desirably, the characteristic analyzing step through the computational fluid dynamics includes the deriving step of in real time deriving the temperature of combustion gas by position in the furnace.

According to the present disclosure, desirably, the characteristic analyzing step through the computational fluid dynamics includes the deriving step of in real time deriving the temperatures of metals by position in the furnace.

According to the present disclosure, desirably, the characteristic analyzing step through the computational fluid dynamics includes the deriving step of in real time deriving slagging production correlation through the temperatures of the combustion gas and metals in the furnace.

According to the present disclosure, desirably, the method further includes the slagging reduction step of determining whether a soot-blower is installed and the installation position of the soot-blower.

BRIEF DESCRIPTION OF THE DRAWINGS

The application file contains at least one drawing executed in color. Copies of this application publication with the color drawings will he provided by the Office upon request and payment of the necessary fee.

The above and other objects, features and advantages of the present disclosure will be apparent from the following detailed description of the exemplary embodiments in conjunction with the accompanying drawings, in which.

DETAILED DESCRIPTION

Figure 1:
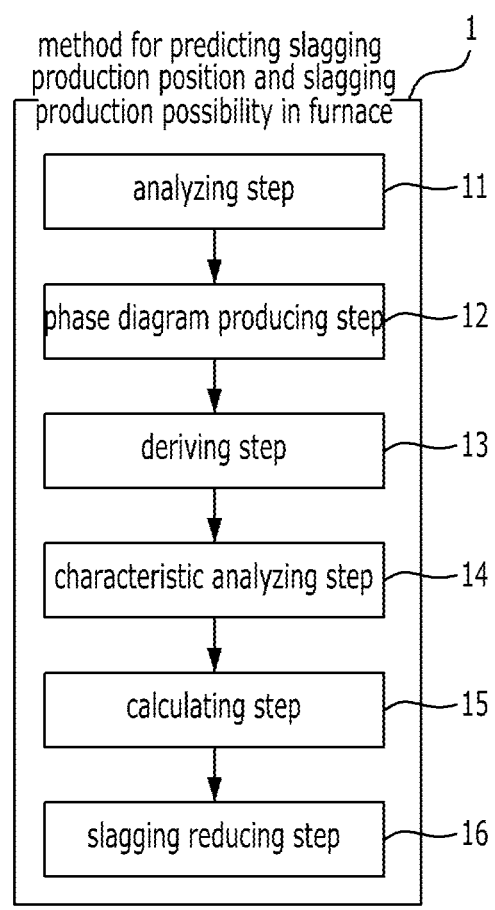
FIG. 1 is a flowchart showing each step in a method for predicting a slagging production position and a slagging production possibility in a furnace.

Hereinafter, an explanation on a method for predicting a slagging production position and a slagging production possibility in a furnace according to the present disclosure will be in detail given with reference to the attached drawing.

The present disclosure is disclosed with reference to the attached drawings wherein the corresponding parts in the embodiments of the present disclosure are indicated by corresponding reference numerals and the repeated explanation on the corresponding parts will be avoided. If it is determined that the detailed explanation on the well known technology related to the present disclosure makes the scope of the present disclosure not clear, the explanation will be avoided for the brevity of the description.

Terms, such as the first, the second, A, and B, may be used to describe various elements, but the elements should not be restricted by the terms. The terms are used to only distinguish one element from the other element. When it is said that one element is described as being "connected" or "coupled" to the other element, one element may be directly connected or coupled to the other element, but it should be understood that another element may be present between the two elements.

As shown in FIG. 1, an electronic control unit (ECU) 1 is programmed for predicting a slagging production position and a slagging production possibility in a furnace according to the present disclosure, which includes: the analyzing step 11 of analyzing physical compositions of two or more kinds of coal; the phase diagram producing step 12 of producing a phase diagram on the basis of the physical compositions of the two or more kinds of coal analyzed through the analyzing step 11; and the deriving step 13 of simulating the situation generated when the two or more kinds of coal are co-fired on the basis of the produced phase diagram and deriving the simulated result. Further, the ECU 1 is further programmed to perform: the characteristic analyzing step 14 of analyzing the characteristics in the furnace in the co-firing process of the two or more kinds of coal with the results derived from the deriving step 13, through computational fluid dynamics; the calculating step 15 of conducting detailed numerical calculation of the two or more kinds of coal; and the slagging reduction step 16 of determining whether a soot-blower is installed and the installation position of the soot-blower.

In more detail, when the two or more kinds of coal are blended and co-fired, they contain ten or more kinds of elements such as iron, aluminum, natrium, calcium and so on, which have different ratios from each other. Accordingly, the composition of each coal is recognized, and next, the melting temperature of the composition is recognized. After that, there is a need for a method for predicting a non-linear melting temperature upon co-firing of the two or more kinds of coal so as to recognize that slagging is in advance prevented when any kinds of coal are co-fired. In this case, above all, the analysis for the two or more kinds of coal should be conducted.

Before the phase diagram producing step 12 of producing the phase diagram, the analyzing step 11 of analyzing the physical compositions of the two or more kinds of coal is first conducted.

Figure 2:
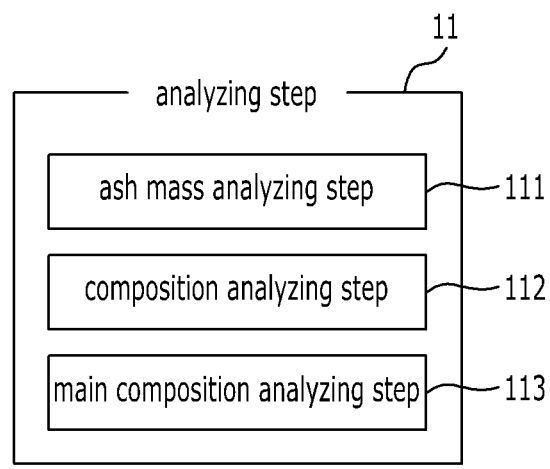
FIG. 2 is a flowchart showing the detailed steps of the analyzing step in the method for predicting a slagging production position and a slagging production possibility in a furnace.

In more detail, as shown in FIG. 2, the analyzing step 11 of analyzing the physical compositions of the two or more kinds of coal includes: the ash mass analyzing step 111 through the proximate analysis of coal; the composition analyzing step 112 of analyzing the kinds of ash compositions; and the main composition analyzing step 113 of analyzing the contents of the ash compositions in detail.

In more detail, the ash mass analyzing step 111 through the proximate analysis of coal is conducted by quantifying moisture, ash, and volatile matter of coal and calculating fixed carbon from them. The fixed carbon is indicated as percentages by weight ratios, and heating values are indicated by using two units like BTU/Lb and kcal/kg.

Through the composition analyzing step 112 of analyzing the kinds of ash compositions and the main composition analyzing step 113 of analyzing the contents of the ash compositions in detail, further, the physical configurations of the two or more kinds of coal are more accurately analyzed. Accordingly, the proximate analysis values, ultimate analysis values, heating values and ash compositions, which are obtained and calculated through the analyzing step 11 including the ash mass analyzing step 111, the composition analyzing step 112 and the main composition analyzing step 113, are stored in separate program and database.

Figure 3:
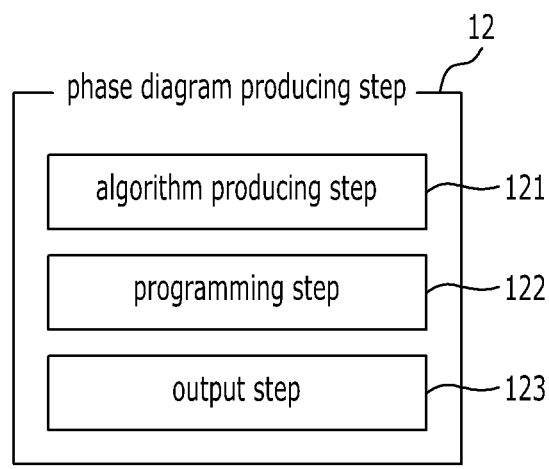
FIG. 3 is a flowchart showing the detailed steps of the phase diagram production step in the method for predicting a slagging production position and a slagging production possibility in a furnace.
Figure 4:
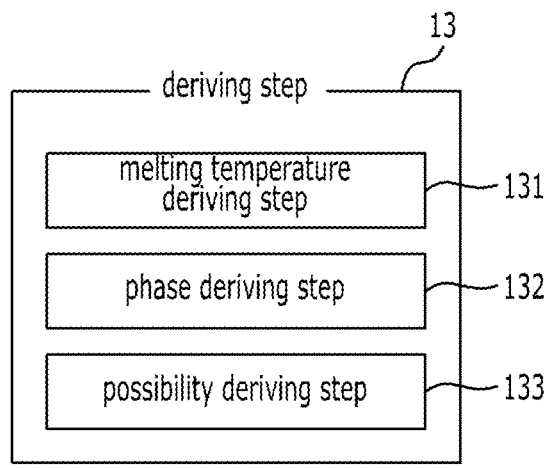
FIG. 4 is a flowchart showing the detailed steps of the deriving step in the method for predicting a slagging production position and a slagging production possibility in a furnace.
Figure 5:
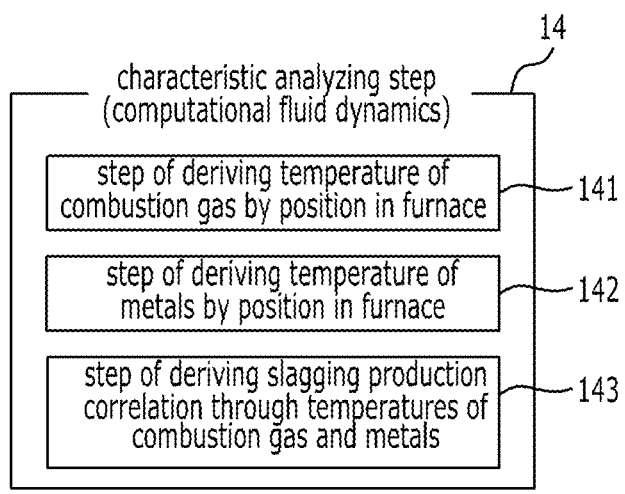
FIG. 5 is a flowchart showing the detailed steps of the characteristic analyzing step in the method for predicting a slagging production position and a slagging production possibility in a furnace.

Referring to FIG. 3, the phase diagram producing step 12 of producing the phase diagram is conducted with the proximate analysis values, ultimate analysis values, heating values and ash compositions obtained and calculated through the analyzing step 11, and through the phase diagram producing step 12, the proximate analysis values, ultimate analysis values, heating values and ash compositions are outputted to the shape of an accurate diagram by means of a computer program of the ECU 1 (representatively, Factsage program). So as to produce the phase program, the Factsage program is representatively utilized.

Figures 6, 7:
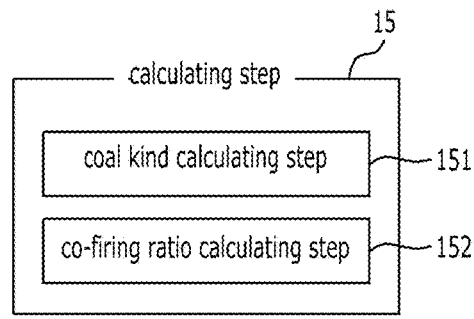
FIG. 6 is a flowchart showing the detailed steps of the calculating step in the method for predicting a slagging production position and a slagging production possibility in a furnace.
FIG. 7 is a schematic view showing a screen on which physical values of blended coal are inputted to a computer program needed to predict a non-linear melting temperature in the method.
Figure 8:
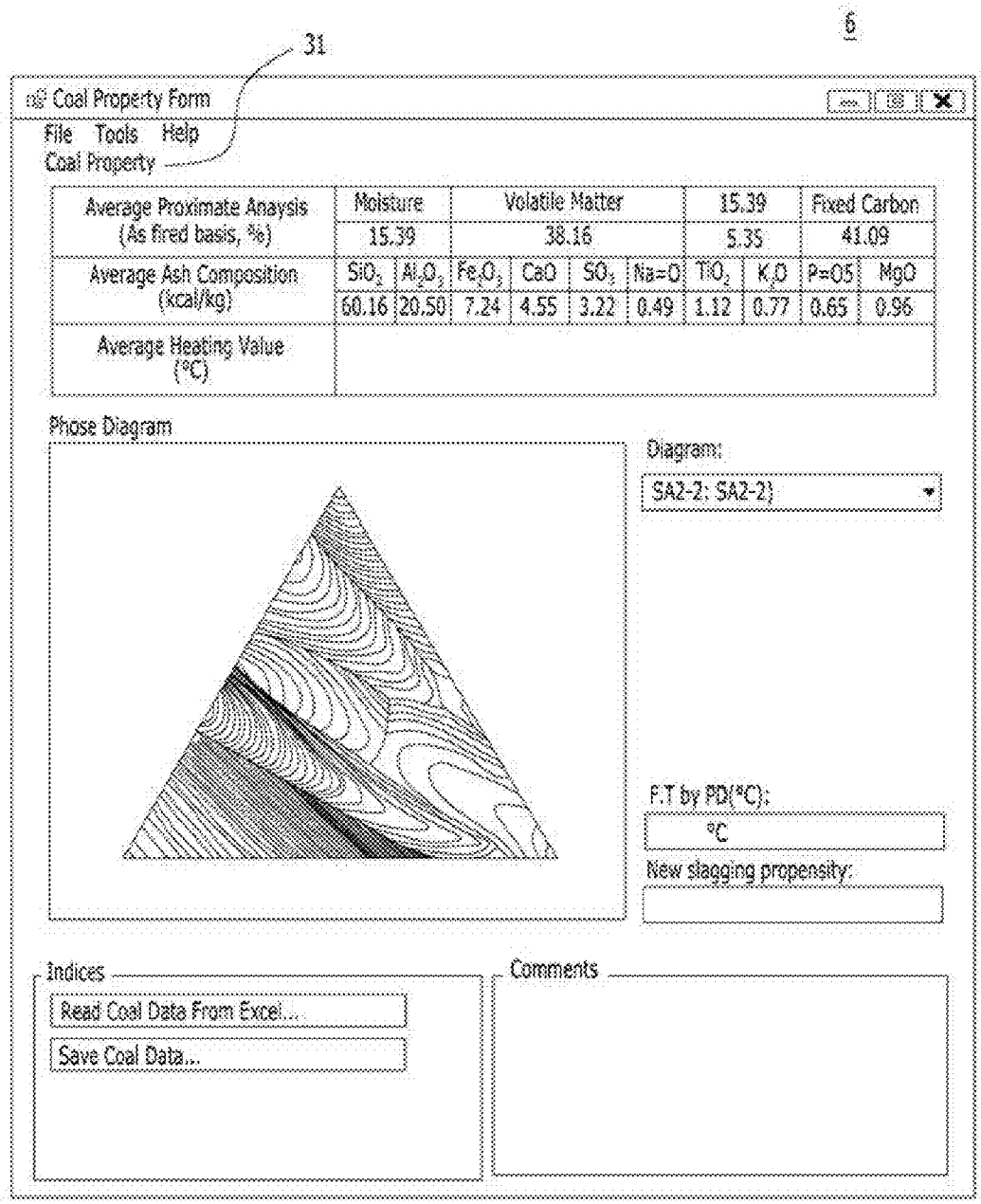
FIG. 8 is a schematic view showing a screen on which physical values of blended coal are inputted to a computer program needed to predict a non-linear melting temperature and outputted as a phase diagram in the method.
Figure 9:
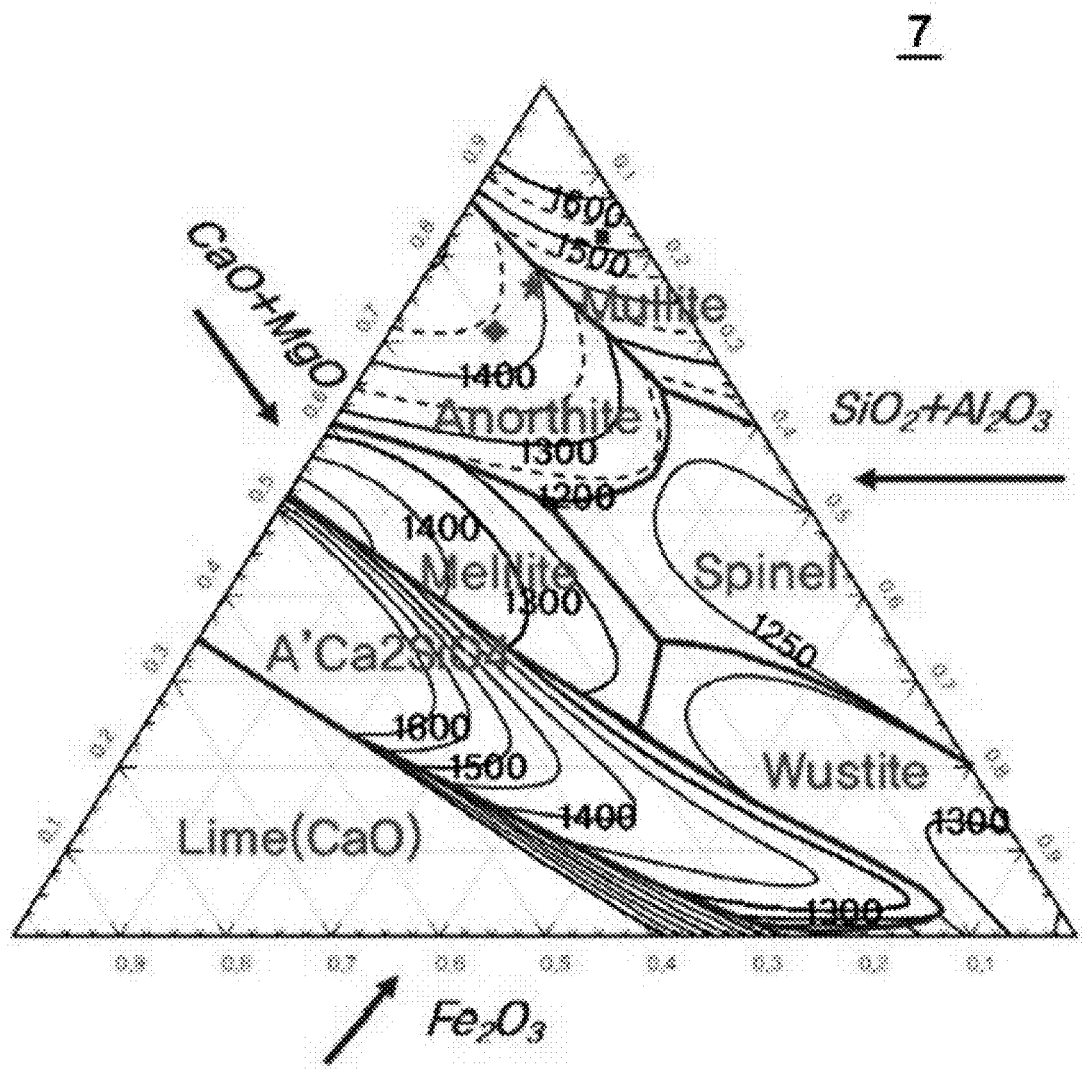
FIG. 9 is a detailed view showing the phase diagram outputted after the physical values of blended coal have been inputted to a computer program needed to predict a slagging production position and a slagging production possibility in a furnace.

In more detail, referring to FIGS. 7 to 9, the phase diagram producing step 12 includes: the algorithm producing step 121 of producing an algorithm of slagging prediction; the programming step 122 of applying the algorithm of slagging prediction to the computer program; and the output step 123 of inputting the algorithm of slagging prediction in the programming step 122 and outputting the inputted results.

In this step, the proximate analysis values, ultimate analysis values, heating values and ash compositions obtained and calculated through the analyzing step 11 are included in the database of the Factsage program as the program for analysis of chemical thermodynamics, and if the kinds of coal are selected and the ratio of each coal is determined (up to maximum five kinds of coal), the physical configuration and thermodynamic characteristics of the blended coal are calculated by the previously produced algorithm with the proximate analysis values, ultimate analysis values, heating values and ash compositions obtained and calculated through the analyzing step 11. With the calculated results, the phase program can be produced.

Referring to FIG. 7, maximum five kinds of blended coal are made in consideration of the kinds of coal used in the coal selection 21 indicated on the right side of the figure, and accordingly, if the kinds of coal are selected, the composition ratios and average values of the proximate/ultimate analysis (%) are obtained under the division of as fired 22 and dried 23 on the basis of the database obtained in the above-mentioned step.

Further, ash compositions (%) 24 are checked on the basis of the database obtained in the above-mentioned step.

Referring to FIG. 8, the average proximate analysis value and the average ash composition value, which are checkable from the database obtained in the above-mentioned step as shown in FIG. 7, are indicated in coal property 31.

In this case, the average ash compositions are calculated according to the ratios of blended coal.

That is, the melting temperatures of the ash compositions are varied as the combinations of the compositions are changed, and in accordance with the combinations of the ash compositions, accordingly, the melting temperatures of the ash compositions are derived by the algorithm.

A degree of slagging is predicted in accordance with the range of the derived melting temperatures.

An index indicating the degree of slagging is called slagging index, and the range of the degree of slagging is divided into severe, high, medium, and low degrees.

Further, a specific portion at which the melting temperature is drastically lowered exists through the combinations of the compositions.

The specific portion is called a eutectic point, and when the eutectic point is passed, the melting temperature is drastically lowered.

At this time, the degree of slagging is in a severe state. Accordingly, the degree of slagging is recognized with the mineral compounds obtained when the coal is co-fired on the basis of the derived melting temperatures and the eutectic point. The degree of slagging is an element for adjusting the kinds of blended coal and the ratios of blended coal.

So as to recognize the slagging properties of the blended coal from the phase diagram on the basis of the average ash composition values, five values, $CaO$, $MgO$, $S_iO_2$, $Al_2O_3$, and $Fe_2O_3$ from the average ash compositions are desirably combined with each other (in this case, however, it is possible that the five values are changed into another ash composition according to desired purposes).

The five values, $CaO$, $MgO$, $S_iO_2$, $Al_2O_3$, and $Fe_2O_3$ are combined to the values, $CaO+MgO$, $S_iO_2+Al_2O_3$, and $Fe_2O_3$ according to the desired purposes, and the sum of the three combined ratios of $CaO+MgO$, $S_iO_2+Al_2O_3$, and $Fe_2O_3$ are relatively regulated to 100% and arranged on three axes. Accordingly, the slagging properties of the blended coal are positioned on the phase diagram.

If the slagging properties of the blended coal are positioned on the phase diagram, it is possible to produce the phase diagram through the utilization of the database previously inputted according to the algorithm of the program.

Referring to FIG. 9, the melting temperatures of the ash compositions of each coal and the blended coal are derived through the produced phase diagram, and accordingly, they can be recognized intuitively from the phase diagram.

In more detail, the phase diagram indicates the temperature conditions according to the kinds of ash slagging, and in this case, if lines are drawn along the respective axes of the percentages of the ratios of $CaO+MgO$, $S_iO_2+Al_2O_3$, and $Fe_2O_3$, they necessarily meet on a point, so that the produced crystals/slagging compositions and the produced temperatures can be recognized intuitively from the phase diagram.

As appreciated from the phase diagram as shown in FIG. 9, for example, if the coal properties of the blended coal are positioned on the phase diagram, the region (anorthite region) indicated by a red star symbol '★' means the ash composition of the anorthite crystal is produced at a temperature of about 1400°.

Further, the combination of blended coal may be indicated by a blue point, and at this time, if the blue point is analyzed, the ash composition of the mullite crystal is produced at a temperature of about 1530°.

Through the melting temperatures of the ash compositions of the coal and the blended coal as well as the produced phase diagram, further, the deriving step 13 includes the phase deriving step 132 of deriving primary phase through the derived phase program.

Since it is possible that the melting temperatures of the ash compositions of the coal and the blended coal are recognized intuitively from the derived phase diagram, in addition, the deriving step 13 includes the possibility deriving step 133 of predicting (through CFD simulation) the temperatures of gas and metals and heat flux by position in the furnace on the basis of the melting temperatures and deriving the slagging production possibility.

With the derived results through the deriving step 13 including the melting temperature deriving step 131 of deriving the melting temperatures of the ash compositions of the coal, the phase deriving step 132 of deriving the primary phase, and the possibility deriving step 133 of deriving the slagging production possibility, the melting temperatures of the ash compositions can be derived to recognize that when any kinds of coal are co-fired, the production of slagging can be in advance prevented, thus achieving an object of the present disclosure.

So as to derive the slagging production position and the slagging production possibility in the furnace through the temperatures of gas and metals and heat flux by position in the furnace through the CFD simulation in the furnace, additionally, the characteristic analysis step 14 is conducted by analyzing the characteristics in the furnace through computational fluid dynamics.

In more detail, if the non-linear melting temperature by coal generated in the process of the co-firing of the two or more kinds of coal has been recognized from the phase diagram, the characteristic analysis step 14 of analyzing the characteristics in the furnace through computational fluid dynamics is conducted by analyzing the physical non-linear values through CFD.

Further, the characteristic analyzing step 14 through the computational fluid dynamics comprises the deriving step 141 of in real time deriving the temperature of combustion gas by position in the furnace, the deriving step 142 of in real time deriving the temperatures of metals by position in the furnace and the deriving step 143 of in real time deriving slagging production correlation through the temperatures of the combustion gas and metals in the furnace.

Figure 10:
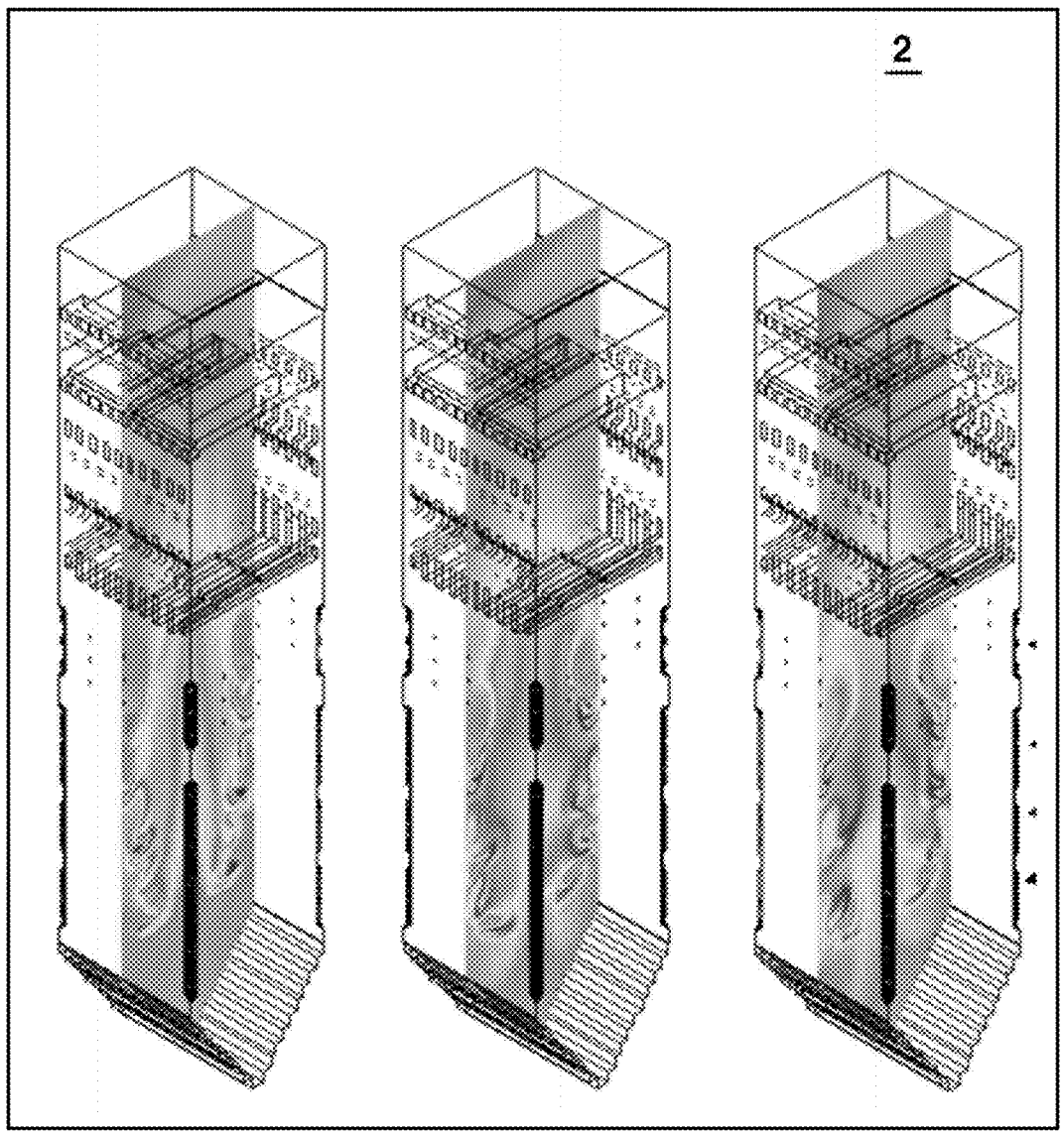
FIG. 10 is a schematic view showing a screen outputted after physical values of blended coal have been inputted to a CFD needed to predict a non-linear melting temperature in the method.
Figure 11:
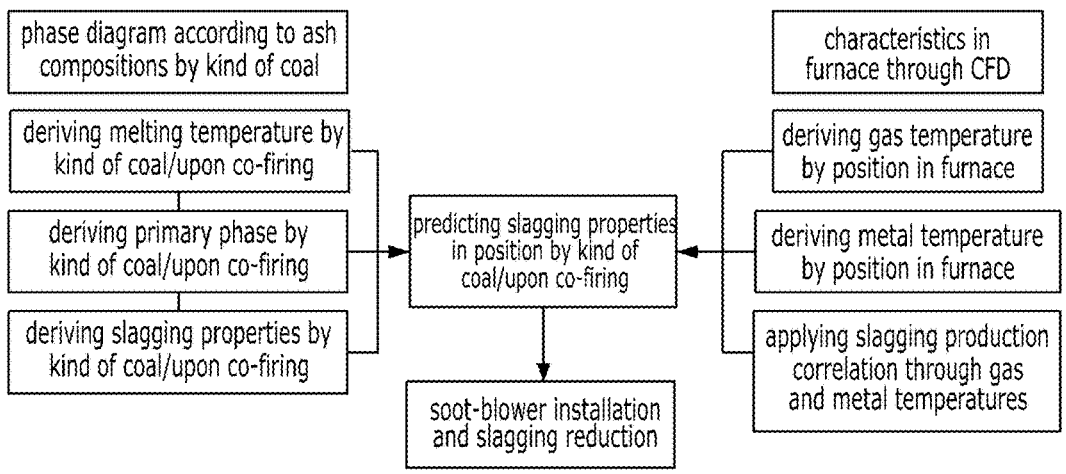
FIG. 11 is a flowchart showing the detailed steps of the method for predicting a slagging production position and a slagging production possibility in a furnace.

Referring to FIG. 10, the analysis through the CFD is conducted by using the physical non-linear values recognized from the phase diagram. A screen 2 displays the result of the analysis.

Like this, if the CFD simulation is carried out, the distribution of the temperatures of gas and metals and heat flux by position in the furnace is derived according to the kinds of coal and the ratios of coal, so that it is possible to predict the slagging properties by position in the furnace according to single coal and blended coal.

Figure 12:
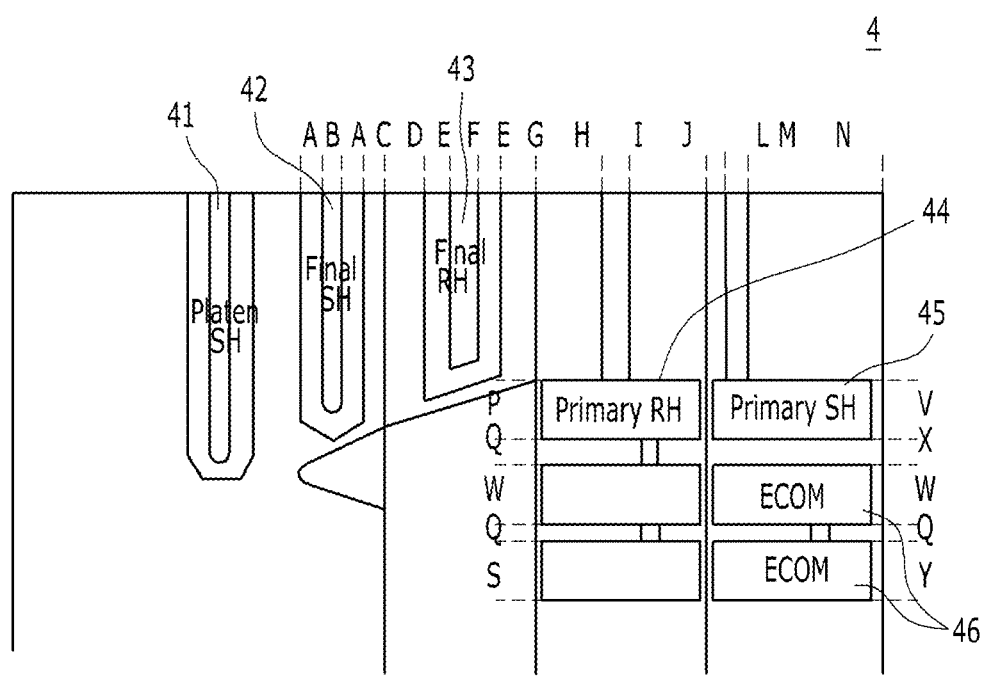
FIG. 12 is a schematic view showing slagging production temperatures of components in the furnace.

Referring in detail to FIG. 12, a heat pipe disposed in a thermal power plant includes a platen superheater 41, a final superheater 42, a final reheater 43, a primary reheater 44, a primary superheater 45 and an economizer 46.

Further, the respective components are located in the furnace according to their position and purpose, and when they are driven, the temperatures applied to them are different from each other.

Accordingly, it is reasonable that appropriate kinds of blended coal are selected on the basis of the designed temperature conditions, but while the plant is actually operating, temperatures different from the designed temperatures may be generated. Further, the temperature may be higher or lower than the designed temperature, thereby undesirably causing slagging to be excessively produced.

In this case, the temperatures are measured through the CFD analysis or other means, thereby allowing the blended coal to be re-changed into another blended coal capable of preventing slagging.

Referring to FIGS. 1 and 6, the calculating step 15 conducts the detailed numerical calculation of the two or more kinds of coal, through the results obtained from the deriving step 13 including the melting temperature deriving step 131 of deriving the melting temperatures of the ash compositions of the coal, the phase deriving step 132 of deriving the primary phase, and the possibility deriving step 133 of deriving the slagging production possibility.

When the efficient kinds of coal are calculated so as not to produce slagging upon the co-firing of the two or more kinds of coal, in more detail, the calculating step 15 includes the coal kind calculating step 151 of calculating the kinds of coal on the basis of the melting temperature deriving step 131 of deriving the melting temperatures of the ash compositions of the coal and the possibility deriving step 133 of deriving the slagging production possibility.

In addition, the calculating step 15 includes the co-firing ratio calculating step 152 of calculating the co-firing ratios of the coal so as not to produce the slagging upon the co-firing of the two or more kinds of coal on the basis of the melting temperature deriving step 131 of deriving the melting temperatures of the ash compositions of the coal and the possibility deriving step 133 of deriving the slagging production possibility.

Through the CFD, also, the distribution of the temperatures of gas and metals and heat flux by position in the furnace is derived according to the kinds of coal and the ratios of coal, and accordingly, if the process of predicting the slagging properties by position in the furnace according to single coal and blended coal is completed, the slagging reduction step 16 is conducted to determine whether a soot-blower is installed or not and the installation position of the soot-blower in consideration of the slagging properties by position in the furnace according to single coal and blended coal.

Through the slagging reduction step 16, in more detail, it is determined whether a soot-blower is installed or not in consideration of the slagging properties by position in the furnace according to single coal and blended coal, and further, the installation position of the soot-blower is determined in consideration of the slagging properties by position in the furnace according to single coal and blended coal, and further, an operation frequency of the soot-blower is determined according to the slagging properties by position in the furnace and a quantity of slagging production in the position.

Further, the respective components 4 disposed in the thermal power plant, such as the platen superheater 41, the final superheater 42, the final reheater 43, the primary reheater 44, the primary superheater 45 and the economizer 46 have the temperatures as indicated in FIG. 12.

Furthermore, the respective components are located in the furnace according to their position and purpose, and when they are driven, the temperatures applied to them are different from each other.

Additionally, the slagging reduction step 16 includes the soot-blower control step of measuring the slagging production frequency and quantity on the respective components 4 disposed in the thermal power plant, storing the measured result in an internal recording device of the thermal power plant, and controlling the operation frequency of the soot-blower located on a position at which the slagging is much produced (for example, if slagging A is produced at a temperature of 1500°, the temperatures applied to the respective components disposed on their respective positions are different, and accordingly, the operation frequency of the soot-blower located on the position at which the slagging is much produced is increased or decreased, thereby controlling the driving of the soot-blower).

As described above, the method for predicting the slagging production position and the slagging production possibility in the furnace can derive the non-linear melting temperature upon co-firing of the two or more kinds of coal, so that the different percentages of the ten or more elements contained in the two or more kinds of coal, such as iron, aluminum, natrium, calcium and so on are recognized and the composition of each coal and the melting temperature of the composition are recognized, thereby recognizing that the production of slagging is in advance prevented when any kinds of coal are co-fired.

In addition, the method for predicting the slagging production position and the slagging production possibility in the furnace can derive the non-linear melting temperature by coal generated in the process of the co-firing of the two or more kinds of coal, so that through the CFD simulation, the temperatures of gas and metals and heat flux by position in the furnace are predicted, thereby predicting the slagging production position and the slagging production possibility in the furnace.

In the above, even if all components of the present disclosure are assembled and operated to one body, the present disclosure is not necessarily defined to the specific embodiments. That is, all components of the present disclosure are selectively coupled and operated to one or more bodies in the scope of the present disclosure. In this application, terms, such as "comprise", "include", or "have", are intended to designate those characteristics, numbers, steps, operations, elements, or parts which are described in the specification, or any combination of them that exist. All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Exemplary embodiments of the present disclosure will be described in detail below with reference to the accompanying drawings. In order to facilitate the general understanding of the present disclosure in describing the present disclosure, through the accompanying drawings, the same reference numerals will be used to describe the same components and an overlapped description of the same components will be omitted

What is claimed is:

1. A method for predicting a slagging production position and a slagging production possibility in a furnace when co-firing two or more kinds of coal as a blended coal, the method comprising:
    an analyzing step of analyzing physical components of two or more kinds of coal, wherein each kind of coal is analyzed independently;
    selecting at least two different kinds of the analyzed two or more kinds of coal as the blended coal;
    calculating a composition ratio and an average composition value for the blended coal, respectively, based on the analyzed physical components of the two or more kinds of analyzed kinds of coal in the analyzing step;
    a phase diagram producing step of producing a phase diagram on the basis of the physical components of the two or more kinds of coal analyzed in the analyzing step and on the basis of the calculated composition ratio of the blended coal and the calculated average composition value of the blended coal;
    a deriving step of simulating a situation generated when the blended coal is fired on the basis of the produced phase diagram to obtain a melting temperature value based on a blended coal composition;
    a characteristic analyzing step of analyzing characteristics in the furnace in the firing process of the blended coal;
    based on the results of the characteristic analyzing step, predicting the slagging production position and the slagging production possibility in the furnace;
    a calculating step of conducting numerical calculation of the two or more kinds of coal with the result of the deriving step; and
    a slagging reduction step of determining an installation position of a soot-blower installed on a wall of the furnace and controlling an operation frequency of the installed soot-blower based upon a position in the furnace of a calculated amount of slagging based on the calculating step.

2. The method according to claim 1, wherein the analyzing step comprises an ash mass analyzing step through the proximate analysis of coal.

3. The method according to claim 1, wherein the analyzing step comprises a composition analyzing step of analyzing the kinds of ash compositions.

4. The method according to claim 1, wherein the analyzing step comprises a main composition analyzing step of analyzing the contents of the ash compositions.

5. The method according to claim 1, wherein the phase diagram producing step comprises:
    an algorithm producing step of producing an algorithm of slagging prediction;
    a programming step of applying the algorithm of slagging prediction to a computer program; and
    an output step of inputting the algorithm of slagging prediction in the programming step and outputting the inputted results.

6. The method according to claim 1, wherein the deriving step comprises a melting temperature deriving step of deriving the melting temperatures of the ash compositions of the blended coal on the basis of the properties of the blended coal recognized through the phase diagram.

7. The method according to claim 1, wherein the deriving step comprises a phase deriving step of deriving primary phase on the basis of the properties of the blended coal recognized through the phase diagram.

8. The method according to claim 1, wherein the deriving step comprises a possibility deriving step of deriving the slagging production possibility on the basis of the properties of the blended coal recognized through the phase diagram.

9. The method according to claim 1, wherein the characteristic analyzing step analyzes the characteristics in the furnace through computational fluid dynamics.

10. The method according to claim 9, wherein the characteristic analyzing step through the computational fluid dynamics comprises a deriving step of in real time deriving the temperature of combustion gas by position in the furnace.

11. The method according to claim 9, wherein the characteristic analyzing step through the computational fluid dynamics comprises a deriving step of in real time deriving the temperatures of metals by position in the furnace.

12. The method according to claim 9, wherein the characteristic analyzing step through the computational fluid dynamics comprises a deriving step of in real time deriving slagging production correlation through the temperatures of the combustion gas and metals in the furnace.

13. The method according to claim 1, wherein the calculating step comprises a coal kind calculating step of calculating kinds of coal on the basis of the melting temperatures of the blended coal recognized through the phase diagram so as to prevent slagging from being produced upon the co-firing of the blended coal.

14. The method according to claim 1, wherein the calculating step comprises a co-firing ratio calculating step of calculating the co-firing ratios of the coal on the basis of the melting temperatures of the blended coal recognized through the phase diagram so as to prevent slagging from being produced upon the co-firing of the blended coal.

* * * * *